US012764471B2

(12) United States Patent
Kemmerer

(10) Patent No.: US 12,764,471 B2
(45) Date of Patent: Oct. 13, 2026

(54) LOUDSPEAKER WITH REDUCED MOUNTING DEPTH AND HIGH EXCURSION

(71) Applicant: Wavtech, LLC, Mesa, AZ (US)

(72) Inventor: Jason Kemmerer, Thousand Oaks, CA (US)

(73) Assignee: Wavtech, LLC, Avondale, AZ (US)

( * ) Notice: Subject to any disclaimer, the term of this patent is extended or adjusted under 35 U.S.C. 154(b) by 125 days.

(21) Appl. No.: 18/430,264

(22) Filed: Feb. 1, 2024

(65) Prior Publication Data

US 2025/0254468 A1 Aug. 7, 2025

(51) Int. Cl.

| | |
|---|---|
| ***H04R 9/06*** | (2006.01) |
| ***H04R 7/12*** | (2006.01) |
| ***H04R 7/18*** | (2006.01) |
| ***H04R 9/04*** | (2006.01) |

(52) U.S. Cl.

CPC ............... *H04R 9/043* (2013.01); *H04R 7/12* (2013.01); *H04R 7/18* (2013.01); *H04R 9/041* (2013.01); *H04R 9/045* (2013.01); *H04R 9/046* (2013.01); *H04R 9/06* (2013.01); *H04R 9/063* (2013.01); *H04R 2400/11* (2013.01)

(58) Field of Classification Search

CPC . H04R 7/12; H04R 7/18; H04R 9/041; H04R 9/043; H04R 9/045; H04R 9/046; H04R 9/06; H04R 9/063; H04R 2400/11

See application file for complete search history.

(56) References Cited

U.S. PATENT DOCUMENTS

| | | | | |
|---|---|---|---|---|
| 4,508,941 | A * | 4/1985 | Wiggins ................. | H04R 9/041 381/412 |
| 6,088,466 | A | 7/2000 | Proni | |
| 6,188,774 | B1 * | 2/2001 | Sabato ................... | H04R 9/043 181/163 |
| 6,343,128 | B1 * | 1/2002 | Coffin ...................... | H04R 9/06 381/186 |
| 6,526,151 | B1 | 2/2003 | Peng | |
| 6,836,551 | B2 | 12/2004 | Kuze et al. | |
| 6,863,152 | B1 | 3/2005 | Sahyoun | |
| 7,236,607 | B2 | 6/2007 | D'Hoogh | |
| 8,290,199 | B2 | 10/2012 | Pircaro | |
| 9,467,783 | B2 | 10/2016 | Bullimore | |
| 9,532,145 | B2 | 12/2016 | Niedermann | |
| 10,349,180 | B2 | 7/2019 | Sumitani et al. | |
| 10,492,005 | B1 | 11/2019 | Lorenz et al. | |
| 10,524,071 | B2 | 12/2019 | Niedermann | |
| 2005/0111690 | A1 | 5/2005 | Onuma et al. | |
| 2005/0117772 | A1 | 6/2005 | Chang | |

(Continued)

*Primary Examiner* — Huyen D Le

(74) *Attorney, Agent, or Firm* — Stetina Garred Brucker & Newboles

(57) ABSTRACT

A low-profile loudspeaker has a speaker motor assembly with a yoke including a central column. One or more magnets are radially disposed around the central column. A top plate is mounted in an axially centered relation to an arrangement of the one or more magnets and the central column. Inner circumferences of the top plate and the one or more magnets and an outer circumference of the central column of the yok define an air gap. One or more axial spiders are mounted to an interior of the central column, with a circumference of the air gap being larger than an outer circumference of the one or more axial spiders.

20 Claims, 5 Drawing Sheets

(56) References Cited

U.S. PATENT DOCUMENTS

| | | | |
|---|---|---|---|
| 2006/0182302 | A1 | 8/2006 | Onodera |
| 2011/0243364 | A1 | 10/2011 | Walter |
| 2014/0219479 | A1 | 8/2014 | Wilk |

* cited by examiner

LOUDSPEAKER WITH REDUCED MOUNTING DEPTH AND HIGH EXCURSION

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to acoustic devices, and more particularly, to a loudspeaker structured with decreased thickness and reduced mounting depth.

2. Related Art

Achieving reduced mounting depth of low frequency loudspeakers, commonly referred to as subwoofers, has long been a desirable goal in the audio market in general and particularly in the car audio market due to the limited available space in automobiles. Subwoofers require significant excursion to reproduce low frequencies, and achieving high output requires yet more excursion with increased motor strength to provide the necessary electromotive force.

Reducing the mechanical excursion range of the moving assembly in a loudspeaker to reduce its overall mounting depth is therefore counterproductive to reproducing low frequencies with high output. It is also counterproductive to reduce the magnetic motor structure size for reduced depth, as decreasing the available electromotive force for a given moving mass results in less excursion capability and lower efficiency.

Attempts to minimize depth by other means such as a shortened diaphragm height results in a weaker structure that requires reinforcement to withstand the mechanical forces involved, adding mass and consequently lowering efficiency for a given motor strength. Lower efficiency requires more power input to achieve the same output, which results in heat buildup that can destroy a loudspeaker.

Other methods for reducing depth by rearrangement of fixed and moving parts in a loudspeaker for mechanical excursion clearance often result in an inherently less stable geometry and a loss of operational reliability without additional countermeasures such as a stiffer suspension which reduces the ability to reproduce lower frequencies efficiently.

Therefore, a structure that achieves an improved balance of electro-mechanical factors in a reduced depth loudspeaker with high excursion that provides satisfactory efficiency, power handling and reliability is needed in the art to address the aforementioned deficiencies.

SUMMARY

The present disclosure describes an improved loudspeaker structure with reduced mounting depth that retains sufficient mechanical clearances for high excursion without compromising motor strength, power handling or efficiency.

In certain embodiments of the present disclosure, a loudspeaker structure is described that has a spider mounted within in the central opening of the yoke of a magnetic motor structure which is connected by a coupling to a diaphragm support structure that transfers force from a voice coil winding on a bobbin suspended within the air gap into the moving assembly attached to a frame by a surround. This centrally disposed spider with force transfer assembly provides the necessary mechanical clearance for high excursion with a reduced mounting depth.

Due to the internal spider configuration, magnetic motor structure size is only limited to that which will fit within the inside diameter of the frame for a given mounting hole size of a panel or enclosure. Consequently, the motor size can be large enough to provide sufficient electromotive force for high excursion with a given moving mass. Additionally, this enables a relatively large diameter voice coil that is inherently more capable of dissipating heat from electrical losses for increased power handling, enabling more power to be applied for producing the electromotive force necessary to overcome the increased air spring resistance in smaller acoustic enclosures with high excursion.

According to one embodiment, a loudspeaker may include a cone, a yoke, one or more magnets, a first spider, and a voice coil. The yoke may include a central column that defines an opening and an inner opening wall. The one or more magnets may encircle the central column of the yoke and define a first air gap section therein. The first spider may define a first spider outer circumferential edge and a first spider inner opening. The first spider may be fixed to a platform along the inner opening wall of the yoke along the first spider outer circumferential edge and to the cone. The voice coil may be wound on a cylindrical former attached to the cone and may be positionable in the first air gap section.

According to another embodiment, a loudspeaker may include a basket and a diaphragm suspended from the basket. There may also be a speaker motor assembly that includes a yoke with a central column. The speaker motor assembly may include one or more magnets radially disposed around the central column of the yoke. The speaker motor assembly may further include a top plate that defines a central opening and may be mounted in an axially centered relation to the one or more magnets and the central column. Inner circumferences of the top plate and the magnet, and an outer circumference of the central column of the yoke may define respective first and second air gap sections. The loudspeaker may also include a voice coil that is wrapped around a bobbin fixed to the diaphragm. The voice coil/bobbin may be positioned to reciprocate within the first and second air gap sections. The loudspeaker may also include one or more axial spiders mounted to an interior of the central column. The one or more axial spiders may be coupled to the diaphragm.

According to another embodiment of the present disclosure, there may be a low-profile loudspeaker. It may include a speaker motor assembly with a yoke, which may have a central column. One or more magnets may be radially disposed around the central column of the yoke. The speaker motor assembly may also include a top plate mounted in an axially centered relation to an arrangement of the one or more magnets and the central column. Inner circumferences of the top plate and the one or more magnets and an outer circumference of the central column of the yoke may define an air gap. The loudspeaker may also include one or more axial spiders that are mounted to an interior of the central column. A circumference of the air gap may be larger than an outer circumference of the one or more axial spiders.

BRIEF DESCRIPTION OF THE DRAWINGS

These and other features and advantages of the various embodiments disclosed herein will be better understood with respect to the following description and drawings, in which.

DETAILED DESCRIPTION

Figure 1:
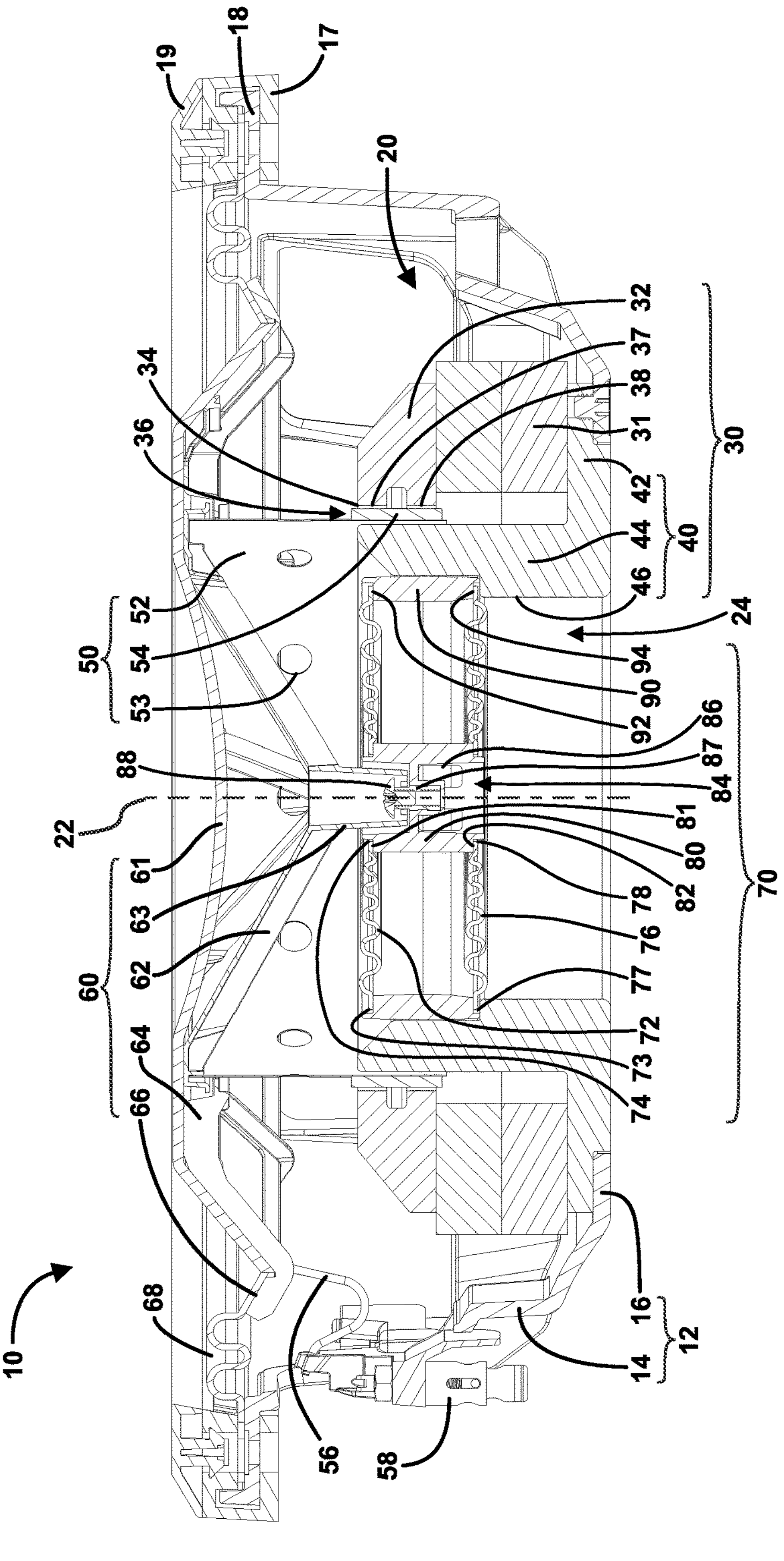
FIG. 1 is a cross-sectional view showing an example of structure of a loudspeaker constructed in accordance with one embodiment of the present disclosure.

The detailed description set forth below in connection with the appended drawings is intended as a description of the presently preferred embodiments a loudspeaker structure with reduced mounting depth and high excursion, herein after referred to as a loudspeaker, and is not intended to represent the only form in which the presented embodiments may be developed or utilized. It is further understood that the use of relational terms such as first and second and the like are used solely to distinguish one from another entity without necessarily requiring or implying any actual such relationship or order between such entities as a singular or multiple entities.

Loudspeaker design and manufacture presents challenges that require optimization of several important electro-mechanical factors that contribute to its performance in various applications. Firstly, loudspeakers are often used in environments where space comes at a premium. For example, the loudspeaker may be installed in an interior panel or enclosure within an automobile or home where available space is limited. Space constraints may be driven by the location in which the loudspeaker is mounted and may require a loudspeaker with a reduced depth to fit in an enclosure with a smaller form factor conforming to the available space. Such a smaller form factor enclosure may also have reduced interior air volume which can limit loudspeaker ability to play at lower frequencies efficiently or produce enough sound pressure level without sufficiently high excursion and power handling to overcome the restricted air volume resistance to compression as an acoustic suspension or air spring. In other words, even if the physical space constraints may be designed around in a reduced depth loudspeaker, there are still inherent obstacles to overcome in its ability to provide high output with reliability in small enclosure air volumes.

Several layers of components make up the moving assembly of a loudspeaker that allows it to vibrate in accordance with an applied power signal corresponding to the audio transduced thereby. Preferably, the suspension of the moving assembly is kept aligned to a central axis and provide sufficient stability throughout its mechanical range of movement or stroke to avoid misalignment of the narrow clearances required for a voice coil suspended in an air gap of a magnetic circuit that is capable of handling enough power to produce the necessary electromotive force to drive the moving mass to high excursion. Misalignment can lead to poor performance and even damage to the loudspeaker itself.

The suspension may also limit the extremes of excursion in a controlled manner to reduce distortion and noise while also preventing parts of the moving assembly from hitting fixed position components within the loudspeaker. During rearward travel, a moving assembly has several potential contact points with fixed position components, particularly the diaphragm with the top plate or other parts of the motor and the voice coil with the back plate. All loudspeaker design factors must come together to create a structure that has the necessary suspension control with appropriate mechanical clearances to prevent hard contact that may damage the loudspeaker.

Additionally, sufficient and consistent electromotive force is necessary over most of the suspension vibration range for a given moving mass to reproduce low frequency music content faithfully with appropriate loudspeaker performance parameters for the intended purpose of high excursion in smaller volume enclosures that are enabled by a reduced depth loudspeaker in the first place.

Referring now to the drawings, there is illustrated an improved loudspeaker structure constructed in accordance with the present invention that achieves a reduced mounting depth with sufficient suspension range and control, mechanical clearances, electromotive force, efficiency and power handling for high excursion in the intended application as set forth.

FIG. 1 depicts the cross-sectional view of one embodiment of a loudspeaker 10 in accordance with the present disclosure, which is generally comprised of a speaker frame 12, also more simply referred to as a frame or basket, including a side wall 14, a rear wall 16 and a mounting flange 18. The mounting flange 18 may have a mounting gasket 17 and a cosmetic trim ring 19. The frame 12 defines an interior 20.

The loudspeaker 10 includes a motor 30 disposed along a central axis 22, and which may be attached to the rear wall 16 of the frame 12. The motor 30 may be comprised of one or more magnets 31 mounted between a top plate 32, also commonly referred to as a front plate, and a flange section 42 of a yoke 40, also commonly referred to as a back plate. The configuration of the magnet 31 may include one or more toroidal or ring magnets, magnet segments or disc magnets placed individually or stacked in an annular arrangement encircling a central column 44 of the yoke 40 and may be comprised of a magnetic material such as ferrite, cobalt, alnico or neodymium. The top plate 32 defines an inner opening edge 34 facing the central column 44 of the yoke 40, also commonly referred to as a pole, where the closest equidistant surfaces between them define an air gap 36. The air gap 36 may be comprised of more than one section of equidistant surfaces forming a first air gap section 37 and a second air gap section 38 that are spaced apart from each other vertically along the top plate inner opening edge 34. A central opening through the central column 44 of the yoke 40 and the flange section 42 that may comprise the yoke 40 defines a central bore 24 of the motor 30 and an inner opening wall 46 of the yoke 40.

A voice coil 50 is comprised of a coil bobbin 52 that may have one or more ventilation ports 53 and a coil winding 54 attached around its surface to fit into the air gap 36 where a magnetic field created by the magnetic circuit of the motor 30 is present. The voice coil 50 may be excited to vibrate along the central axis 22 according to the electromotive force produced by the current of an electrical signal passing through the coil winding 54 while positioned in a magnetic field present in the air gap 36, where the first air gap 37 and the second air gap 38 may provide more than one area of focused magnetic field flux density spread apart along the height of the coil winding 54. This is contemplated to increase the range of linear excursion with higher efficiency while also allowing a shorter winding height to minimize the rearward travel clearance necessary to prevent the voice coil 50 from hard bottoming against the flange section 42.

The coil winding 54 may receive an electrical signal by its connection through tinsel leads 56 routed through a cone support extension 64 and out to suitable electrical terminals 58 that may be mounted externally to the frame 12 along the side wall 14.

The vibration force produced by the voice coil 50 from an applied electrical signal may transferred into vibration of a diaphragm 60 by physical connection.

In one embodiment of the present disclosure, the voice coil 50 is coupled to the diaphragm 60 through a force transfer assembly 62. The diaphragm 60 may be comprised of a cone 61, the force transfer assembly 62 and the cone support extension 64. The diaphragm 60 may be suspended within the interior 20 of the frame 12 by a surround 68 affixed between the frame mounting flange 18 and an engagement flange 66 of the cone support extension 64 while also connected to a spider assembly 70 through a center plug 63 formed at the bottom of the force transfer assembly 62 attached to a spider coupling 80.

The spider assembly 70 may be comprised of a first spider 72 defining an inner opening 74 and an outer circumference 73. According to one embodiment, the spider assembly 70 may also include a second spider 76 defining an inner opening 78 and an outer circumference 77. The spider assembly 70 may incorporate the spider coupling 80 with a first engagement flange 81 and a second engagement flange 82 and a platform 90 with a first engagement flange 92 and a second engagement flange 94. The first spider may be attached to the first engagement flange 81 of the spider coupling 80 at its inner opening 74 and the first engagement flange 92 of the platform 90 at its outer circumference 73. The second spider 76 may be attached to the second engagement flange 82 of the spider coupling 80 at its inner opening 78 and a second engagement flange 94 of a platform 90 at its outer circumference 77.

The interior of the spider coupling 80 defines a central bore 84 for receiving a connection with the center plug 63 of the force transfer assembly 62 and may include one or more ventilation ports 86 allowing air pressure from between the first spider 72 and the second spider 76 to be relieved out through a central bore 24 of the motor 30.

Figure 2:
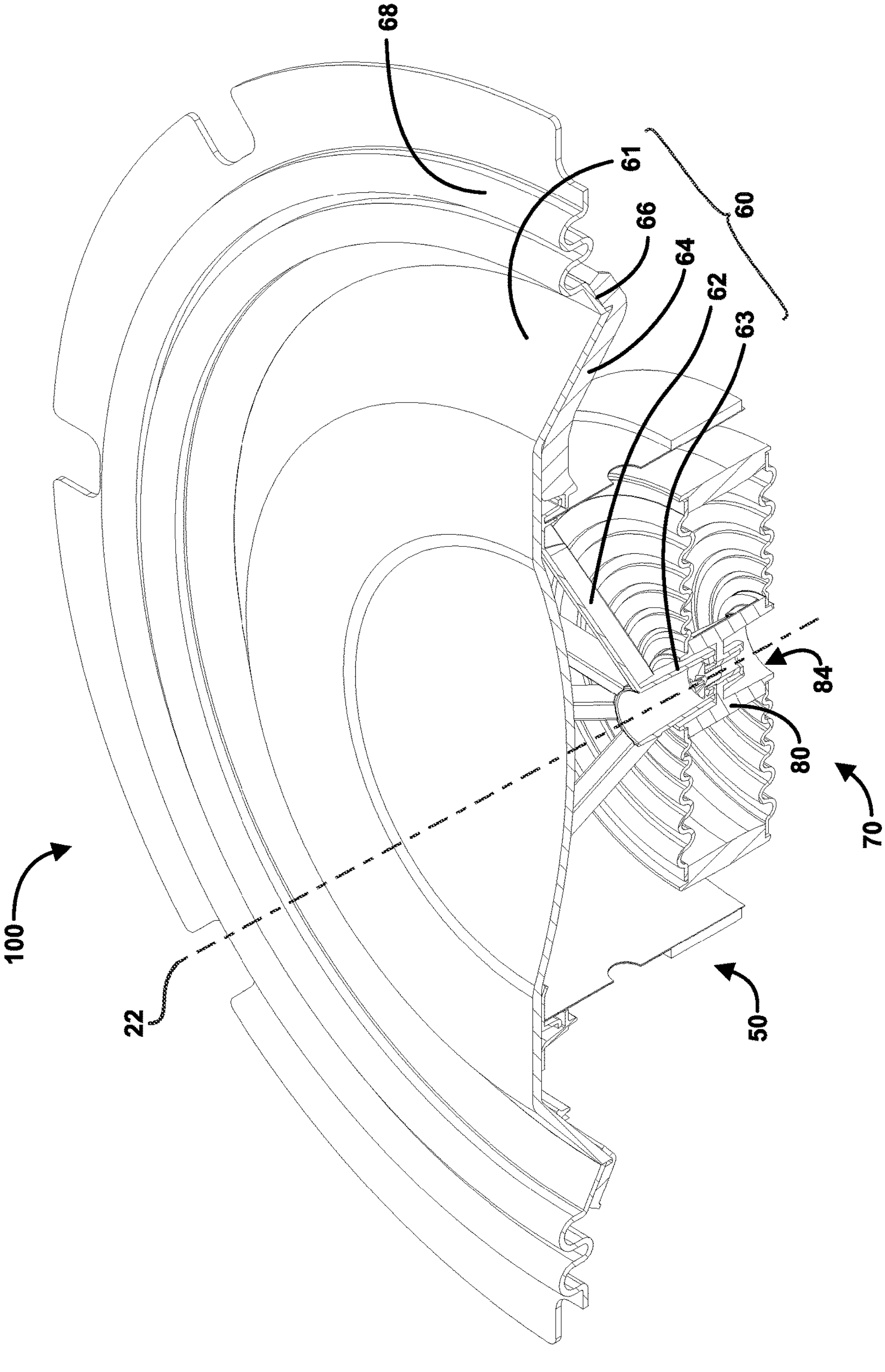
FIG. 2 is a cross-sectional perspective view of a moving assembly of a loudspeaker in accordance with one embodiment of the present disclosure.
Figure 7:
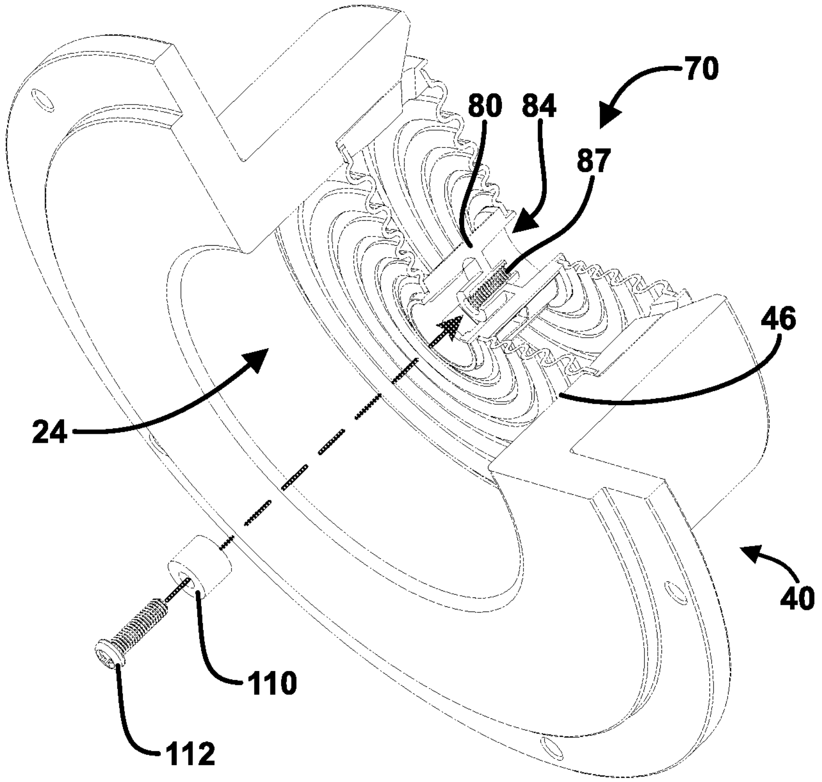
FIG. 7 is a sectioned perspective view showing that an external mass can be added to a spider coupling in accordance with one embodiment of the present disclosure.

As shown in the detailed view of FIG. 2 and FIG. 7, the spider coupling 80 may also have an insert 87 disposed in the central bore 84 for receiving a screw 88 or other fastener to secure the center plug 63 to the spider coupling 80 which may allow, for example, an external mass 110 such as a metal cylinder or washer to be attached to the opposite end of the spider coupling by another screw 112 or other such fastener for the purpose of tuning the resonance of a moving assembly 100 after the loudspeaker 10 is completely assembled.

The spider assembly 70 may be fixed along an inner opening wall 46 of the yoke 40, which positions the same within a central bore 24 of the motor 30 and allows the path of rearward travel of the first spider 72 and the second spider 76 to be free from potential contact with any fixed components of the loudspeaker 10. Further, this location allows the diaphragm 60 sufficient rearward clearance for high excursion, while also providing an inherently stable triangular suspension arrangement of the center plug 63 attachment point to the spider assembly 70 in the spider coupling 80 on the central axis 22 positioned within the central bore 24 of the motor 30 with a substantial distance and angle to an attachment point of the surround 68 to the mounting flange 18 of the frame 12. As illustrated in detail in FIG. 2, the moving assembly 100 is thereby significantly stabilized for movement along the central axis 22 of the loudspeaker 10.

FIG. 2 is a cross-sectional perspective view of the moving assembly 100 of one embodiment of the loudspeaker 10 shown in FIG. 1 in accordance with the present disclosure generally comprised of the spider assembly 70 and the surround 68 that may be connected to the cone support extension 64 of the diaphragm 60 that may also be comprised of the cone 61 and the force transfer assembly 62, and where the voice coil 50 may also be connected to the diaphragm 60 through the force transfer assembly 62. While the surround 68 provides some of the necessary suspension and damping of the moving assembly 100, the centrally disposed spider assembly 70 connected to the diaphragm 60 through the plug 63 of the force transfer assembly 62 in the central bore 84 of the spider coupling 80 may provide substantial centering force and damping to stabilize and control its motion throughout the mechanical stroke along the loudspeaker axis 22.

Figure 3:
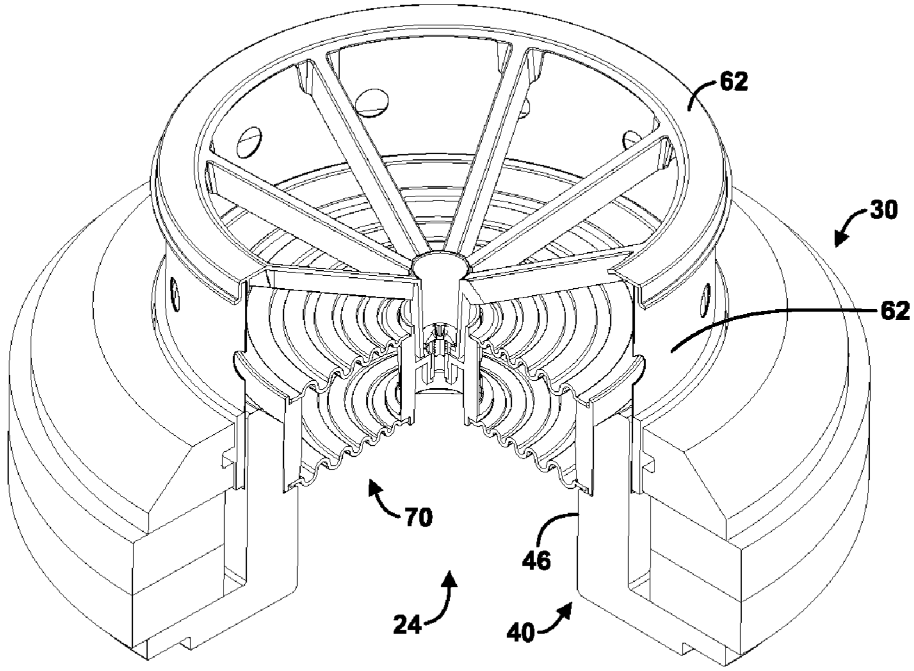
FIG. 3 is a cross-sectional perspective view of a motor with a spider assembly connected to a voice coil in accordance with one embodiment of the present disclosure.

FIG. 3 shows a sectioned perspective view of one embodiment of the loudspeaker 10 from FIG. 1 in accordance with the present disclosure of the motor 30 with the spider assembly 70 positioned in the central bore 24 of the motor 30 fixed along the inner opening wall 46 of the yoke 40 where it may be connected to the voice coil 50 though the force transfer assembly 62.

Figure 4:
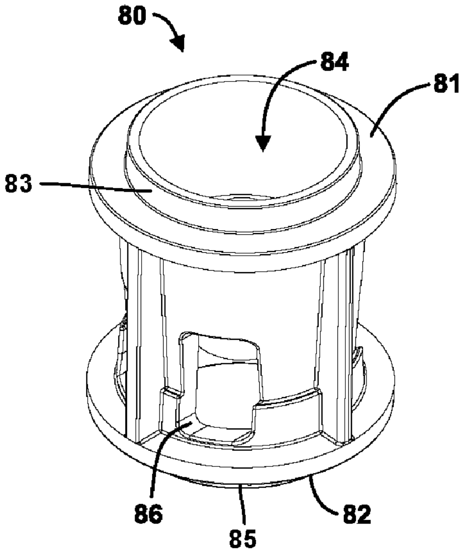
FIG. 4 is a perspective view of a spider coupling with ventilation ports in accordance with one embodiment of the present disclosure.

FIG. 4 shows a perspective view of the spider coupling 80 of one embodiment of the loudspeaker 10 in accordance with the present disclosure of an interior of the spider coupling 80 that defines the central bore 84, which may include one or more ventilation ports 86, the first engagement flange 81 and the second engagement flange 82. Extending outwardly or upwardly from the first engagement flange 81 may be a first spider coupling extension 83 and extending outwardly or downwardly from the second engagement flange 82 may be a second spider coupling extension 85.

Figure 5:
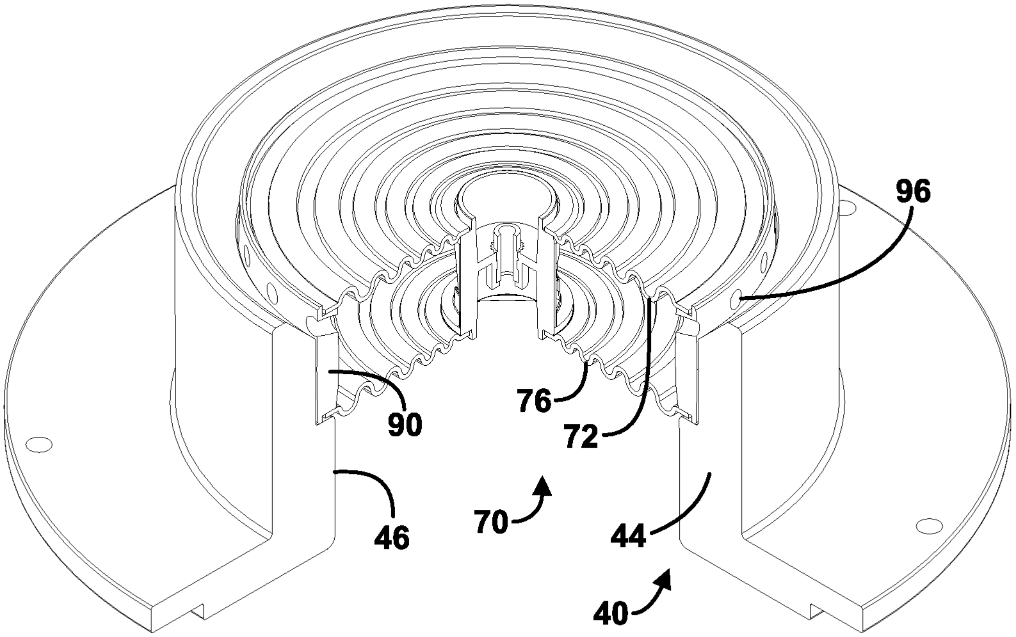
FIG. 5 is a cross-sectional perspective view of a spider assembly mounted along an inner wall of a yoke with ventilation ports in a platform in accordance with another embodiment of the present disclosure.

FIG. 5 shows a sectioned perspective view of another embodiment of the loudspeaker 10 in accordance with the present disclosure of the spider assembly 70 fixed along an inner opening wall 46 of the yoke 40 where it may have one or more ventilation ports 96 around the perimeter of the platform 90 so as to not be blocked by the central column 44 of the yoke 40 to provide relief of air pressure that may be produced during excursion between the first spider 72 and the second spider 76. Additionally, it is contemplated that the ventilation ports prevent noise. Although the ventilation ports 96 are illustrated as being defined on the platform 90, it will be appreciated that they may be incorporated in the central column 44 as well. It is to be understood that the platform 90 may also be part of the yoke 40 collectively.

Figure 6:
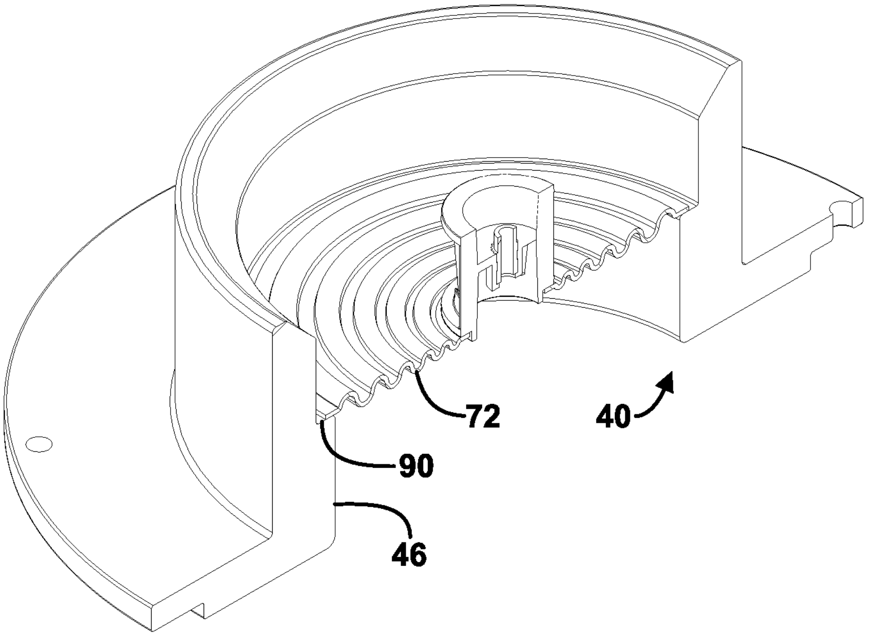
FIG. 6 is a cross-sectional perspective view of a single spider on a platform along the inner wall of the yoke in accordance with another embodiment of the present disclosure.

FIG. 6 shows a sectioned perspective view of another embodiment of a loudspeaker 10 in accordance with the present disclosure of a single spider configuration where the first spider 72 may be fixed to the platform 90 along an inner opening wall 46 of the yoke 40.

FIG. 7 shows a sectioned perspective view of another embodiment of the loudspeaker 10 in accordance with the present disclosure, which has the ability to attach the external mass 110 by access through the central bore 24 of the motor 30 with the screw 112 to the bottom of the insert 87 disposed in the central bore 84 of the spider coupling 80 fixed along the inner opening wall 46 of the yoke 40 for the purpose of adding mass to the moving assembly 100 after the loudspeaker 10 has been assembled, where the moving mass directly contributes to the performance parameters of the loudspeaker 10 that may make it suitable for mounting in enclosures of a particular range of acoustic air volumes, and adding a specific amount of additional mass may tune it to be suitable for even smaller enclosure air volumes by lowering resonance to extend low frequency response that would otherwise be attenuated.

The particulars shown herein are by way of example and for purposes of illustrative discussion of the embodiments of the loudspeaker and are presented in the cause of providing what is believed to be the most useful and readily understood description of the principles and conceptual aspects. In this regard, no attempt is made to show details with more particularity than is necessary, the description taken with the drawings making apparent to those skilled in the art how the several forms of the present disclosure may be embodied in practice.

What is claimed is:

1. A low-profile loudspeaker, comprising:

a speaker motor assembly including a yoke with a central column, one or more magnets radially disposed around the central column of the yoke, and a top plate mounted in an axially centered relation to an arrangement of the one or more magnets and the central column, inner circumferences of the top plate and the one or more magnets and an outer circumference of the central column of the yoke defining an air gap; and one or more axial spiders mounted along an inner opening wall of a central bore extending through the central column, a circumference of the air gap being larger than an outer circumference of the one or more axial spiders.

2. The low-profile loudspeaker of claim 1, further comprising:

a cone;

a voice coil wound on a cylindrical former attached to the cone and positionable in the air gap.

3. The low-profile loudspeaker of claim 2, further comprising:

a force transfer assembly with one or more connecting branches attached around a predefined circular region of the cone and extending toward a center of a first one of the one or more axial spiders.

4. The low-profile loudspeaker of claim 3, further comprising a spider coupling attached to a first one of the axial spiders and to a second one of the axial spiders, the spider coupling being connectible to the force transfer assembly.

5. The low-profile loudspeaker of claim 4, wherein the spider coupling is receptive to mass tuning elements.

6. The low-profile loudspeaker of claim 4, wherein the spider coupling defines one or more ventilation ports.

7. The low-profile loudspeaker of claim 4, wherein the spider coupling includes one or more spider engagement flanges and a first spider coupling extension, and a second spider engagement flange and a second spider coupling extension.

8. The low-profile loudspeaker of claim 1, wherein the yoke further defines a flange section from which the central column extends, the one or more magnets being attached to the flange section.

9. The low-profile loudspeaker of claim 1, wherein the central column of the yoke defines one or more ventilation ports.

10. A loudspeaker, comprising:

a basket;

a diaphragm suspended from the basket;

a speaker motor assembly including a yoke with a central column, one or more magnets radially disposed around the central column of the yoke, and a top plate mounted in an axially centered relation to an arrangement of the one or more magnets and the central column, inner circumferences of the top plate and the one or more magnets and an outer circumference of the central column of the yoke defining an air gap; and one or more axial spiders mounted along an inner opening wall of a central bore extending through the central column, the one or more axial spiders being coupled to the diaphragm.

11. The loudspeaker of claim 10, further comprising:

a voice coil wrapped around a bobbin fixed to the diaphragm and positioned to reciprocate within the air gap.

12. The loudspeaker of claim 10, further comprising a force transfer assembly connecting the diaphragm and a first one of the one or more axial spiders.

13. The loudspeaker of claim 12, further comprising a spider coupling attached to a first one of the axial spiders and to a second one of the axial spiders, the spider coupling being connectible to the force transfer assembly.

14. The loudspeaker of claim 13, wherein the force transfer assembly includes one or more connecting branches attached around a predefined circular region of the diaphragm and extending towards a center plug engageable to the spider coupling.

15. The loudspeaker of claim 13, wherein the spider coupling is receptive to mass tuning elements.

16. The loudspeaker of claim 13, wherein the spider coupling defines one or more ventilation ports.

17. The loudspeaker of claim 13, wherein the spider coupling includes one or more spider engagement flanges and a first spider coupling extension, and a second spider engagement flange and a second spider coupling extension.

18. The loudspeaker of claim 13, further comprising a spider platform positioned in the yoke, the first spider and the second spider being mounted to the spider platform.

19. The loudspeaker of claim 18, wherein the spider platform defines one or more ventilation ports.

20. The loudspeaker of claim 10, wherein the yoke further defines a flange section from which the central column extends, the one or more magnets being attached to the flange section.

* * * * *